United States Patent [19]

Wang

[11] Patent Number: 5,702,612
[45] Date of Patent: Dec. 30, 1997

[54] METHOD AND APPARATUS FOR FLOTATION SEPARATION

[75] Inventor: Xiang-Huai Wang, Lexington, Ky.

[73] Assignee: University of Kentucky Research Foundation, Lexington, Ky.

[21] Appl. No.: 504,819

[22] Filed: Jul. 20, 1995

[51] Int. Cl.$^6$ .................. C02F 1/24; B03D 1/24
[52] U.S. Cl. .................. 210/703; 210/707; 210/201; 210/202; 210/221.2; 210/256; 210/322; 210/704; 209/170; 209/164
[58] Field of Search .................. 210/703, 704, 210/705, 706, 707, 202, 221.2, 256, 201, 294, 322; 209/164, 166, 168, 170

[56] References Cited

U.S. PATENT DOCUMENTS

| | | |
|---|---|---|
| 2,142,207 | 4/1939 | Price . |
| 2,730,190 | 1/1956 | Brown . |
| 2,766,203 | 10/1956 | Brown . |
| 3,175,687 | 3/1965 | Jones . |
| 3,428,175 | 2/1969 | Hukki . |
| 3,505,188 | 4/1970 | Pan . |
| 4,237,004 | 12/1980 | Helke . |
| 4,280,886 | 7/1981 | Sawa . |
| 4,477,338 | 10/1984 | Hellmann . |
| 4,490,259 | 12/1984 | Coffing . |
| 4,612,113 | 9/1986 | Kallioinen . |
| 4,889,638 | 12/1989 | Rockford et al. . |
| 4,997,549 | 3/1991 | Atwood . |
| 5,116,487 | 5/1992 | Parekh . |
| 5,234,112 | 8/1993 | Valenzuela et al. . |
| 5,249,688 | 10/1993 | Hwang . |

FOREIGN PATENT DOCUMENTS

| | | |
|---|---|---|
| 814878 | 3/1981 | U.S.S.R. . |
| 1430353 | 10/1988 | U.S.S.R. . |

OTHER PUBLICATIONS

"Application of Air Flotation to Refinery Waste Waters" by Rohlich Industrial and Engineering Chemistry vol. 46, No. 2 Feb. 1954.

Primary Examiner—Thomas M. Lithgow
Attorney, Agent, or Firm—King & Schickli

[57] ABSTRACT

A flotation method and apparatus for separating a selected constituent from an effluent of an industrial process is provided. The apparatus includes a conditioning tank and a flotation cell. The conditioning tank allows mixing a flotation reagent with an effluent and includes a mechanism for also dissolving gas in the effluent within the conditioning tank. The flotation cell includes a dissolved gas flotation chamber having an overflow for recovering the selected constituent and a tailings drain. In addition, the flotation cell also includes an added gas flotation chamber having a sparger for injecting gas into the effluent, an overflow for recovering the selected constituent and a tailings drain.

10 Claims, 1 Drawing Sheet

METHOD AND APPARATUS FOR FLOTATION SEPARATION

TECHNICAL FIELD

The present invention relates to an improved flotation apparatus and method for separating a selected constituent from an effluent of an industrial process in a more cost effective and efficient manner.

BACKGROUND OF THE INVENTION

Flotation methods for separating particles, which have been suspended in a fluid or effluent, by selectively attaching the particles to be removed to a light fluid and allowing this particle-fluid aggregation to rise to where it can be removed, are well known in the art. Such methods are used in various industries, including but not limited to waste water treatment and purification, waste recovery, metal processing and coal cleaning.

Many state of the art flotation methods employ the use of multiple chamber flotation cells for the repeated treatment of the effluent. For example, U.S. Pat. No. 4,612,113 to Kallioinen discloses a flotation cell including an outer flotation chamber having a discharge lip which feeds an inner flotation chamber through an inlet conduit. Both inner and outer flotation chambers employ injected air as the flotation fluid. Further, each chamber includes a mixer apparatus composed of a stator-rotor combination causing the conditions within the chambers to be very dynamic. The resulting agitation to the effluent is too great to allow small particles to effectively form stable aggregates with the air rising in the chambers and, accordingly, this apparatus does not allow effective separation of small particles.

Similarly, U.S. Pat. No. 4,490,259 to Coffing discloses a multiple chamber flotation cell including bubble generators in each cell for generating bubbles to engage and aggregate with the particles to be separated from the effluent. Once again, however, conditions in the flotation chambers are too dynamic to allow small particles to effectively form stable aggregates with the bubbles rising in the chambers. Accordingly, separation of small or fine particles is not achieved with any significant effect or efficiency.

While the multichamber flotation cells of Kallioinen, Coffing and other patents may be suitable for the separation of certain size particles or constituents, conditions within the cells are simply too turbulent to allow efficient and effective separation of fine particles of perhaps less than 0.1 µm in diameter. More specifically, the turbulence produced in the media during processing is sufficiently strong to overcome the physical and chemical forces causing the particles to aggregate with the gas bubbles. As a result, the particles break free from the rising gas bubbles and remain, unseparated in the effluent.

Accordingly, it should be appreciated that a need exists for an apparatus and method that provide still more efficient and effective separation and enhanced recovery of extremely fine particles. Such apparatus and method should also be capable of efficiently separating and recovering relatively larger particles also contained within the effluent of an industrial process.

SUMMARY OF THE INVENTION

Accordingly, it is a primary object of the present invention to provide a flotation method and apparatus for separating a selected constituent from an effluent which overcomes the above described limitations of the prior art.

Another object of the present invention is to provide a flotation method and apparatus to separate from an effluent both extremely fine and, if present, relatively larger particles of a selected constituent.

Yet another object of the present invention is to provide a flotation method and apparatus providing quiescent hydrodynamic conditions within at least one chamber of a flotation cell. Such conditions serve to promote and maintain aggregate formation so that even very fine particles may be separated as desired.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved flotation method and apparatus for separating a selected constituent from an effluent of an industrial process is provided.

The method includes the initial step of mixing the effluent with a flotation reagent. The flotation reagent that is utilized renders the selected constituent within the effluent hydrophobic and promotes its effective separation from the effluent. Next is the step of dissolving a gas such as air or carbon dioxide into the effluent at a first pressure. The resulting effluent, flotation reagent and dissolved gas mixture is then introduced into a first chamber of a flotation cell at a lower, second pressure. As a result of the change in pressure the dissolved gas in the effluent is gradually released, thereby generating very fine microbubbles. Otherwise, totally quiescent hydrodynamic conditions are maintained in the first chamber of the flotation cell. As a result, the microbubbles become strongly attached to the hydrophobic particles of selected constituent forming stable micro-aggregates that rise to the top of the first chamber where a layer of froth forms.

The particles of selected constituent are then recovered by collecting the layer of froth containing the particles of selected constituent. This may be done by any means known in the art including the provision of an overflow through which the froth and selected constituent contained therein may be delivered to a collection vessel. Simultaneously, the tailings remaining in the first chamber of the flotation cell are delivered to a second chamber of the flotation cell. A gas is injected into the second chamber through, for example, a conventional sparger which creates larger bubbles that rise through the effluent. The remaining constituent (usually relatively larger particles) in the tailings attach to and rise with these bubbles thereby forming a froth at the top of the second chamber. The particles of constituent in this froth may also be recovered by collecting the froth layer by means of an overflow that delivers the froth and particles of constituent to a collection vessel and/or allows further processing.

In accordance with yet another aspect of the present invention, the flotation method further includes the step of also introducing the effluent, flotation reagent and dissolved gas mixture into a third chamber of the flotation cell which is connected in fluid communication with the first chamber. This third chamber is positioned so that its longitudinal axis extends at an angle substantially perpendicular to the longitudinal axis of the first chamber. The third chamber acts as a rougher separator that facilitates the separation of the selected constituents (made hydrophobic by mixture with the flotation reagents) from hydrophilic constituents and the effluent.

As a result of the spatial orientation of the longitudinal axis of the third chamber in a substantially horizontal plane, conditions in the third chamber are exceedingly quiescent. Thus, small and even submicron hydrophobic particles of constituent interact and associate to form loosely bound micro-aggregates. As these micro-aggregates migrate toward the first chamber they are spontaneously floated by the microbubbles being generated by the release of the dissolved gas so that they are collected in the froth for recovery. Under less quiescent conditions characteristic of all known prior art flotation techniques, turbulence generated in the effluent would be sufficiently strong to break the micro-aggregates and redistribute the small particles in the effluent. Thus, it should be appreciated that the small particle recovery efficiency characteristic of the present invention is not attainable with commonly practiced prior art approaches.

In addition, a flotation apparatus for separating a selected constituent from an effluent of an industrial process is provided. The apparatus includes a conditioning tank and associated multichamber flotation cell. The conditioning tank allows the mixing of a flotation reagent with the effluent. An agitator may also be provided to increase the efficiency of this mixing process. A mechanism is also provided to dissolve gas into the effluent at a first pressure. The resulting effluent, flotation reagent and dissolved gas mixture is then transferred via a feed line to the first chamber of the flotation cell.

There is a pressure drop as the mixture enters the first chamber of the flotation cell. This begins the dissolved gas flotation process. The hydrophobic particles of selected constituent(s) attach to the microbubbles created from the release of the resulting effluent under pressure and rise to the top of the first flotation cell where a froth collection system is provided for recovery. A tailings drain is contained within the first chamber for simultaneously delivering the tailings (i.e. the resulting effluent which is remaining) to a second chamber of the flotation cell. The second chamber contains a sparger for injecting gas into the effluent. Here the remaining hydrophobic particles of selected constituent attach to the relatively larger bubbles created by the sparger and rise to the top of the second chamber where they are collected as a froth along with the separated constituent from the first chamber. A tailings drain is also provided for the second chamber for discharging the effluent after the two-stage separation is completed.

Preferably, the flotation cell further includes a third chamber which acts as a rougher separator and is connected in fluid communication with the first chamber. The third chamber has a longitudinal axis that extends horizontally from the first chamber which has a longitudinal axis that extends vertically. Effluent, flotation reagent and dissolved gas mixture is introduced into the third chamber. As described above, this facilities the separation of very fine hydrophobic particles from the hydrophilic particles and the effluent. Hydrophobic constituents within the third chamber slowly migrate into the first flotation chamber where they continue to rise under the influence of the microbubbles produced by the dissolved gas flotation. The stable micro-aggregates that form are drawn into the froth at the top of the second chamber from which they may be recovered through an overflow.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawings.

Figure 1:
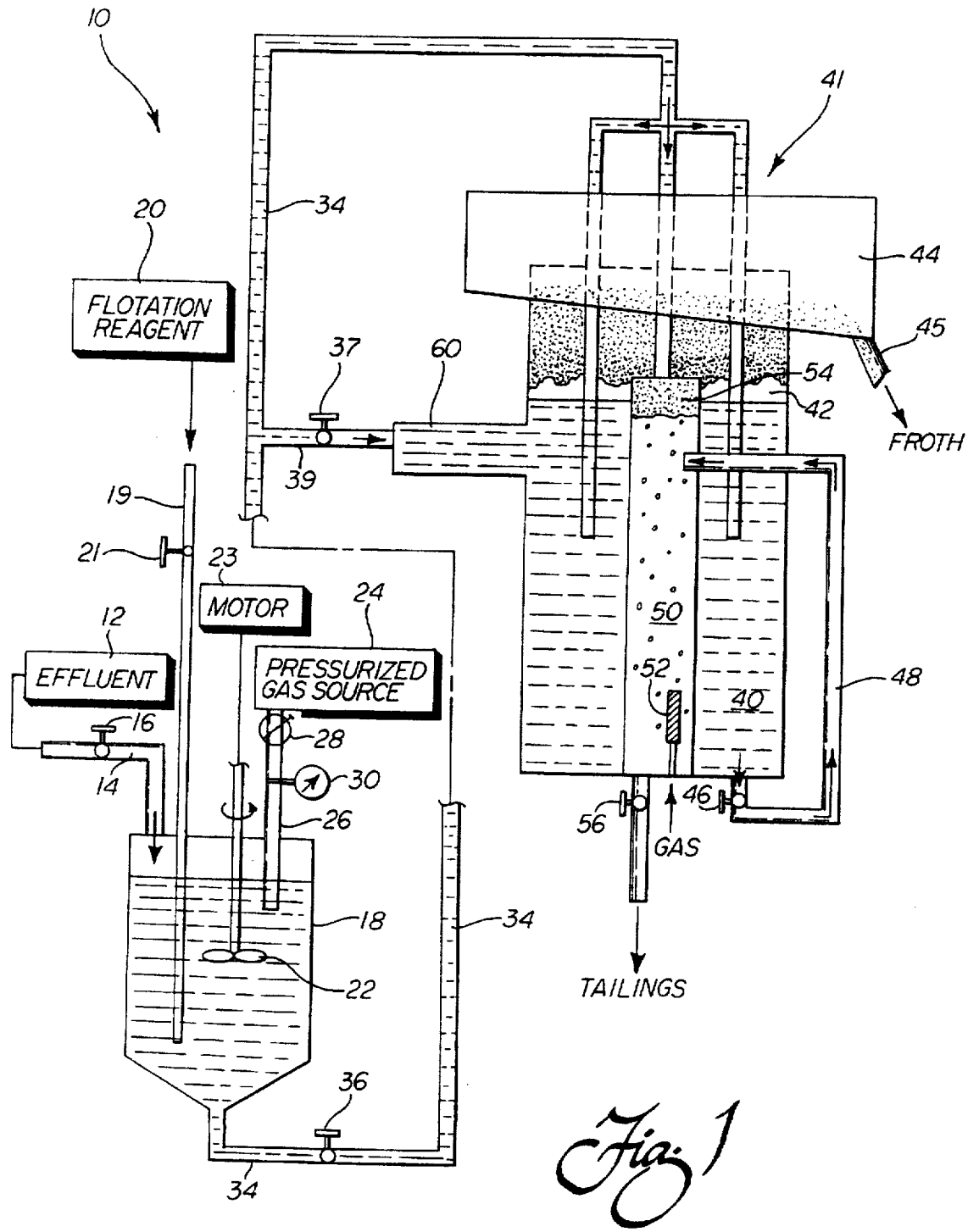
FIG. 1 is a schematical sectional view of the flotation apparatus of the present invention.

Reference will now be made in detail to the present preferred embodiment of the invention, an example of which is illustrated in the accompanying drawing.

DETAILED DESCRIPTION OF THE INVENTION

Reference is now made to FIG. 1 showing the flotation apparatus 10 of the present invention. The flotation apparatus 10 provides an efficient and effective way of separating a selected constituent from an effluent 12 of an industrial process, such as but not limited to wastewater treatment and purification, industrial waste recovery, metal processing and coal cleaning.

Effluent 12 is first delivered via feed line 14 to a conditioning tank 18. A valve 16 in feed line 14 controls the rate of flow of effluent 12 to the conditioning tank 18. A flotation reagent 20 is then added to the effluent 12 within the conditioning tank 18. Specifically, the flotation reagent 20 is delivered via feed line 19. A valve 21 controls the flow of the flotation reagent along the feed line 19. The flotation reagent 20 is added to the effluent 12 to render the selected constituent to be recovered hydrophobic.

Typical reagents commonly used in flotation systems are classified as collectors, frothers and modifiers. Collectors are organic molecules which have two distinct parts; polar and non-polar. The polar end of the collector molecule attaches to the surface of the constituent to be recovered; the non-polar portion of the molecule is exposed to the water. The thin coating of collector transforms the constituent particles from hydrophilic to hydrophobic. Hydrophobic means that the constituent particles become repulsed by water. When the coated particles come into contact with an air bubble, the particles adhere to the bubble and rise to the surface therewith.

Frothers are added to the flotation system to help form a stable froth which can be collected and removed. Frothers perform this function by becoming more concentrated at air-water interfaces than in the body of the water. This changes the surface free energy of the air-water interface. When a bubble strikes the interface, it does not break, because the kinetic energy associated with its movement can be adsorbed by diffusion of more frother to the interface. Because the surface must absorb the energy, it is important that the concentration of frother be such that a small change in frother concentration produces a large change in surface energy.

Modifiers are added to flotations systems to alter the chemical behavior of the collector or the selected constituent, or both. For example, if CN is added to a pulp which contains pyrite (FeS$_2$), an iron cyanide complex is formed on the surface of the pyrite which prevents the attachment of the collector and, therefore, prevents the flotation of the pyrite.

From these remarks it should be appreciated that the flotation reagent utilized in the present method may be a single reagent or a mixture of one or more collectors, frothers and/or modifiers. Flotation reagents useful in separating particular constituents are well known to those skilled in the art.

A rotating impeller 22 driven by a motor 23 serves to agitate and mix the effluent 12 and flotation reagent 20 in the conditioning tank 18. During agitation, a gas (such as air, carbon dioxide or nitrogen) from a pressurized gas source 24 is introduced into the conditioning tank 18 through feed line 26 by means of the flow control valve 28. Preferably, the gas is introduced into the effluent at a pressure in a range of 20–50 psig. This pressure is monitored by viewing the pressure gauge 30. Of course, as a result of the positive pressure introduction of gas into the sealed conditioning tank 18, gas is dissolved into the effluent 12. Once the effluent, flotation reagent, and dissolved gas are agitated and equilibrium is reached inside the conditioning tank 18 the resulting mixture is delivered through feed line 34 to the first flotation chamber 40 of flotation cell 41. A valve 36 in feed line 34 allows control of the rate of delivery of the resulting mixture into the first flotation chamber 40. Preferably, the resulting effluent is delivered to the first flotation cell at a rate of substantially 2–30 lpm.

The first flotation chamber 40 provides for separation relying exclusively upon the action of dissolved gas flotation. More specifically, the mixture is introduced into the first flotation chamber 40 at a second pressure that is lower than the pressure utilized to dissolve the gas in the conditioning tank 18. Due to the sudden pressure drop experienced upon introduction to first flotation chamber 40, the mixture effervesces as the dissolved gas is released in the effluent as extremely fine microbubbles with sizes in the micron range (i.e. approximately 10–300 μm). The particles of constituent, treated with the flotation reagent so as to become hydrophobic, self associate with the microbubbles thereby forming micro-aggregates. These micro-aggregates slowly rise in the chamber 40.

An important aspect of the flotation apparatus 10 is the quiescent hydrodynamic conditions that exist during the dissolved gas flotation process taking place in the first flotation chamber 40. The self association process of the submicron constituent particles is strongly influenced by the hydrodynamic conditions in the effluent. More specifically, the formation of micro-aggregates requires a very quiescent hydrodynamic condition because the attractive force between the constituent particles and microbubbles is extremely weak. A very small turbulent force can break the micro-aggregate and redisperse the fine particles of constituent into the effluent. Thus, a very quiescent hydrodynamic condition is required during the micro-aggregate formation stage and the subsequent separation stage in order to achieve an effective separation, particularly for the separation of extremely fine particles. Therefore, the presence of these conditions makes the new flotation apparatus 10 particularly suitable for the separation of extremely fine particles. The lower size limit of particle separation for the flotation apparatus 10 is less than 0.1 μm in many applications. The efficient and effective separation of particles in this size range distinguishes this invention from any prior art flotation method.

As the micro-aggregates and remaining free microbubbles rise, a stable thick layer of froth 42 is formed at the top of the first flotation chamber 40. From here, the selected constituent is collected and removed by means of an overflow recovery system 44 of a type known in the art including a conduit 45 which, for example, may lead to a vessel (not shown) for directly collecting froth, including the constituent, for further processing depending upon the particular application.

In addition, a tailings drain valve 46 is provided for substantially simultaneously removing the tailings from the first flotation chamber 40 to be delivered by feed line 48 to a second flotation chamber 50. The second flotation chamber 50 serves as a secondary separation chamber and employs a sparger 52 for bubble generation. The bubbles generated from the sparger 52 have a size range of substantially 400–900 μm. The gas flow rate through the sparger in the second flotation chamber 50 preferably ranges from 0.2 to 3.5 lpm. A more preferred gas flow rate is 1.0 to 2.0 lpm. The larger bubbles generated through the sparger 52 better provide for separation of the relatively larger hydrophobic particles remaining in the tailings that were not removed by separation while in the first flotation chamber 40 (i.e. those that the smaller microbubbles produced by dissolved gas flotation did not float to the surface for collection in the froth 42). Having the second flotation chamber 50 in series with the first flotation chamber 40 allows for a more complete and effective separation of the selected constituent. Specifically, both relatively small and large particles of constituent may be separated and recovered in orderly and efficient fashion.

A layer of froth 54 is formed at the upper end of the second flotation chamber 50 as the remaining constituent particles attach to the bubbles generated by the sparger and rise to the surface. The froth layer 54 is collected and removed along with the froth layer 42 from the first flotation cell by means of the overflow recovery system 44. A tailing drain valve 56 is also provided at the bottom of the second flotation chamber 50 for discharging the remaining effluent once the separation process of the selected constituent is completed. This effluent may be recycled and undergo further processing as required and known to those skilled in the art.

As should be further appreciated, the first flotation chamber 40 and the second flotation chamber 50 of the flotation cell 41 are positioned such that they are concentrically disposed relative to each other. In addition, the flotation cell may also include a third flotation chamber 60 that is preferably connected to and placed in fluid communication with the first flotation chamber 40. The third flotation chamber 60 includes a longitudinal axis extending substantially perpendicular to a longitudinal axis of the first flotation chamber 40: that is, the longitudinal axis of the third flotation chamber 60 extends in a substantially horizonal plane while the longitudinal axis of the first flotation chamber 40 extends in a substantially vertical plane. This third flotation chamber 60 serves as a rougher separator that facilitates the separation of very fine constituent particles made hydrophobic by the action of the flotation reagent.

Reviewing the operation of the flotation apparatus 10, the conditioning tank 18 is initially charged with the desired quantity of the effluent 12 and flotation reagent 20. The flow control valve 16 and 21 are then closed. Pressurized gas is then delivered from the pressurized gas source 24 past the flow control valve 28 through the feed line 26 into the conditioning tank 18. As the gas pressure increases, greater and greater quantities of gas are dissolved in the effluent, flotation reagent and dissolved gas mixture. The rotating impeller 22 insures complete mixing. Once the desired gas pressure is reached and this is confirmed by monitoring the pressure gage 30, the valve 28 is closed.

Next, the valves 36, 37 are opened and the effluent, flotation reagent and dissolved gas mixture is pumped or otherwise delivered through the feed lines 34, 39 into the first and third flotation chambers 40, 60 at a rate of between substantially 2-30 lpm. A substantially identical rate of flow is maintained past the drain valves 46 and 56 to insure proper operation of the apparatus 10. If the upper surface level of the mixture in the first chamber 40 should, however, be below the third chamber 60, the mixture is initially delivered only to the first chamber 40. Once the upper surface level of the mixture being delivered to the first flotation chamber 40 rises above the upper level of the third flotation chamber 60, valve 37 is then opened and the effluent, flotation reagent and dissolved gas mixture is also delivered through the feed line 39 to the third flotation chamber 60.

Upon delivery to the first and third flotation chambers 40, 60 the mixture undergoes a pressure drop. This causes the mixtures to effervesce as the dissolved gas generates microbubbles. These microbubbles begin to rise. Fine particles, made hydrophobic by mixture with the flotation reagent 20, self associate with the microbubbles forming micro-aggregates. These micro-aggregates remain stable in the otherwise quiescent conditions in the flotation chambers 40, 60. This is particularly true in the horizontally extending third flotation chamber 60.

Over time the micro-aggregates and some remaining free microbubbles migrate through the mixture and rise to the surface of the liquid phase in the first flotation chamber 40. There a froth 42 is formed. This froth 42 is collected by means of the overflow recovery system 44.

Substantially simultaneously, tailings are collected from the bottom of the first flotation chamber 40 through the drain valve 46. These tailings are then directed through the flow line 48 to the second flotation chamber 50. In this chamber larger bubbles are generated by means of the injection of air through a sparger 52 adjacent the bottom of the chamber. The larger particles of constituent remaining in the effluent and flotation reagent mixture associate with these larger bubbles and rise to the top of the liquid phase where a froth 54 is formed. This froth 54, like the froth 42 in the first flotation chamber 40 is eventually collected by means of the overflow recovery system 44. The froth 42, 54 may then be further treated to recover the selected constituent as desired. Of course, simultaneously, the mixture of effluent and flotation reagent, now cleaned of substantially all of the selected constituent, passes as tailings through the drain valve 56. These tailings may be subsequently recycled or processed to, for example, recover the flotation reagent from the effluent.

The processing capacity of the flotation apparatus 10 will largely be determined by the type and quantity of effluent undergoing processing, the separation efficiency required and the relative volumes of the three flotations chambers. Retention time in the flotation apparatus 10 typically ranges from 1-10 minutes, with a preferable retention time of 3-6 minutes. With conventional flotation systems the retention time is generally 10-20 minutes. This means that for the same total volume, the flotation apparatus 10 will have a throughput of 2-5 times that of conventional flotation systems that are in commercial use at present.

Preferably, the first, second and third flotation chambers 40, 50, 60 have a relative volumetric capacity of between approximately 1:10:1 and 1:10:4. Thus, in one exemplary apparatus 10, the first flotation chamber 40 may have an outer diameter of 3 ft and a length (height) of 7 ft. The second flotation chamber 50 may have an outer diameter of 1 ft and a length (height) of 5 ft. The third flotation chamber 60 may have an outer diameter of 2 ft. and a length of 2-3 ft.

In summary, numerous benefits have been described which result from employing the concepts of the present invention. Advantageously, the apparatus and method of the present invention provide for improved efficiency and enhanced recovery for separating a selected constituent from an effluent of an industrial process. Advantageously, the present method and apparatus first provide for dissolved gas flotation under extremely quiescent conditions. This serves to allow the recovery of very fine constituent particles not recoverable with prior art flotation approaches. This is followed by added or injected gas flotation. Larger bubbles are produced and larger constituent particles are thereby recovered. As a result, a broader particle range is effectively recovered and overall recovery efficiency is significantly enhanced over flotation systems of prior art design.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A method of separating a selected constituent from an effluent of an industrial process comprising the steps of:

mixing the effluent with a flotation reagent;

dissolving gas into the effluent;

introducing a resulting effluent, flotation reagent and dissolved gas mixture into a third chamber of a flotation cell acting as a rougher separator in fluid communication with a first chamber of the flotation cell under conditions promoting a release of dissolved gas as microbubbles in the mixture, said third chamber having a longitudinal axis extending at an angle substantially perpendicular to a longitudinal axis of said first chamber;

recovering floated selected constituent from the first chamber and delivering non-floated tailings from the first chamber to a second chamber of the flotation cell;

sparging gas into the non-floated tailings delivered to the second chamber; and recovering the selected constituent from the non-floated tailings being processed in the second chamber.

2. The method set forth in claim 1, wherein said introducing of the mixture into the first chamber is completed at a rate of between substantially 2-20 lpm.

3. The method set forth in claim 2, wherein said introducing the mixture into the third chamber is completed at a rate of between substantially 2-10 lpm.

4. The method set forth in claim 3, wherein said sparging of gas into the second chamber is completed at a rate of between substantially 0.2-3.5 liters of gas per minute.

5. A flotation apparatus for separating a selected constituent from an effluent of an industrial process, comprising:

a conditioning tank for mixing flotation reagent with the effluent;

means for dissolving gas in the effluent;

(1) a dissolved gas flotation chamber for completing dissolved gas flotation under otherwise quiescent conditions, said dissolved gas flotation chamber including an overflow for recovering the selected constituent and a tailings drain;

(2) a sparged gas flotation chamber for completing sparged gas flotation, said sparged gas flotation chamber including a means for sparging gas into the tailings from the dissolved gas flotation chamber, an overflow for recovering the selected constituent and a tailings drain; and (3) conduit means for feeding a mixture of effluent and flotation reagent from said conditioning tank to said dissolved gas flotation chamber and tailings from said dissolved gas flotation chamber to said sparged gas flotation chamber.

6. The apparatus set forth in claim 5, wherein said gas dissolving means is a pressurized gas source for delivering gas under pressure to said conditioning tank.

7. The apparatus set forth in claim 5, further including a rougher separator chamber in fluid communication with said dissolved gas flotation chamber, said rougher separator chamber having a longitudinal axis extending substantially perpendicular to a longitudinal axis of said dissolved gas flotation chamber.

8. The apparatus set forth in claim 7, wherein said dissolved gas flotation chamber and said sparged gas flotation chamber are concentrically disposed relative to each other.

9. The apparatus set forth in claim 7, wherein said dissolved gas flotation chamber, said injected gas flotation chamber and said rougher separator chamber have a relative volume ratio of between 1:10:1 to 1:10:4.

10. The apparatus set forth in claim 5, wherein said sparging means is a sparger for producing bubbles having a size of substantially 400–900 µm.

* * * * *